July 7, 1959
E. BAGNALL
2,893,723
VEHICLE SWAY INHIBITING DEVICE
Filed July 7, 1955
2 Sheets-Sheet 2
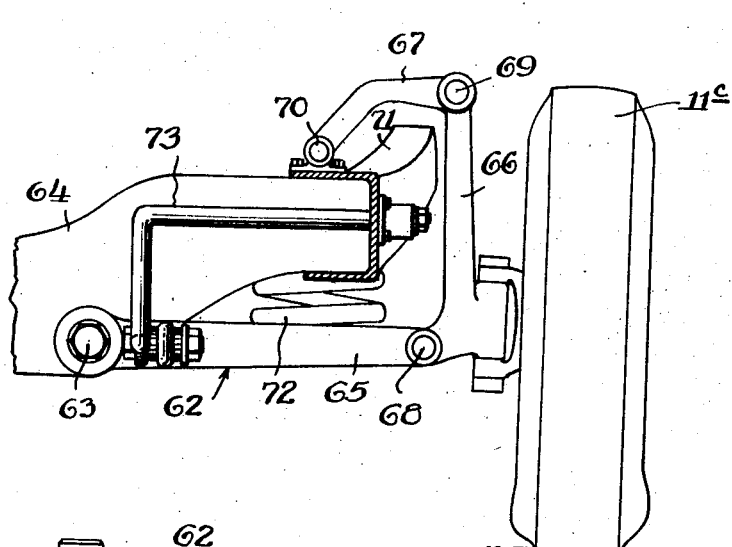
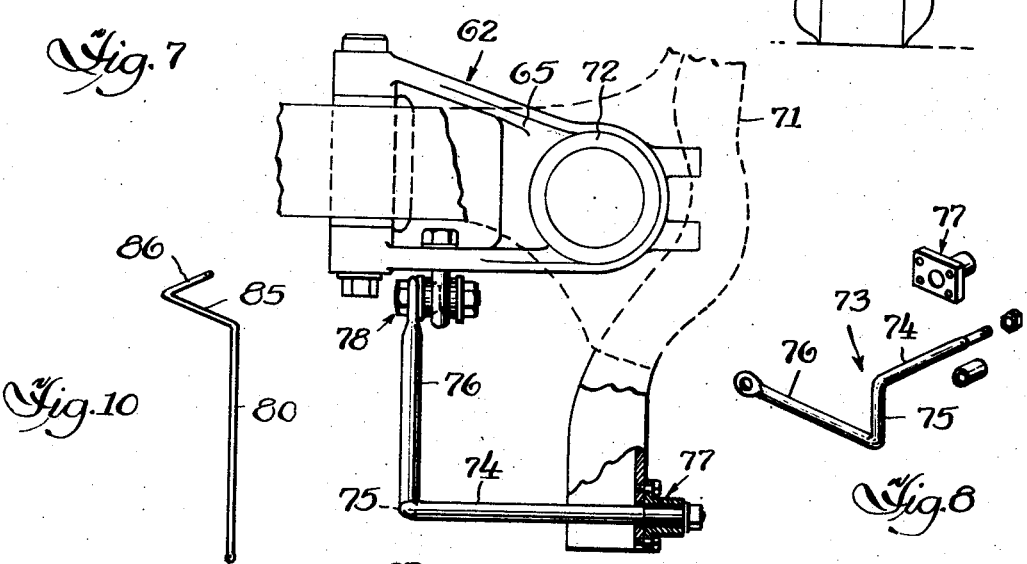
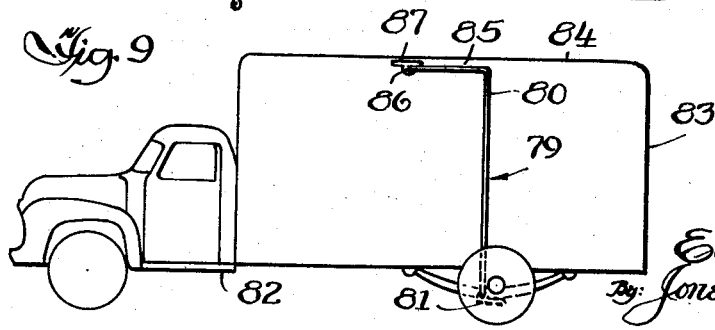
Inventor,
Edwin Bagnall.
By Jones, Tesch & Darbo
Attys.

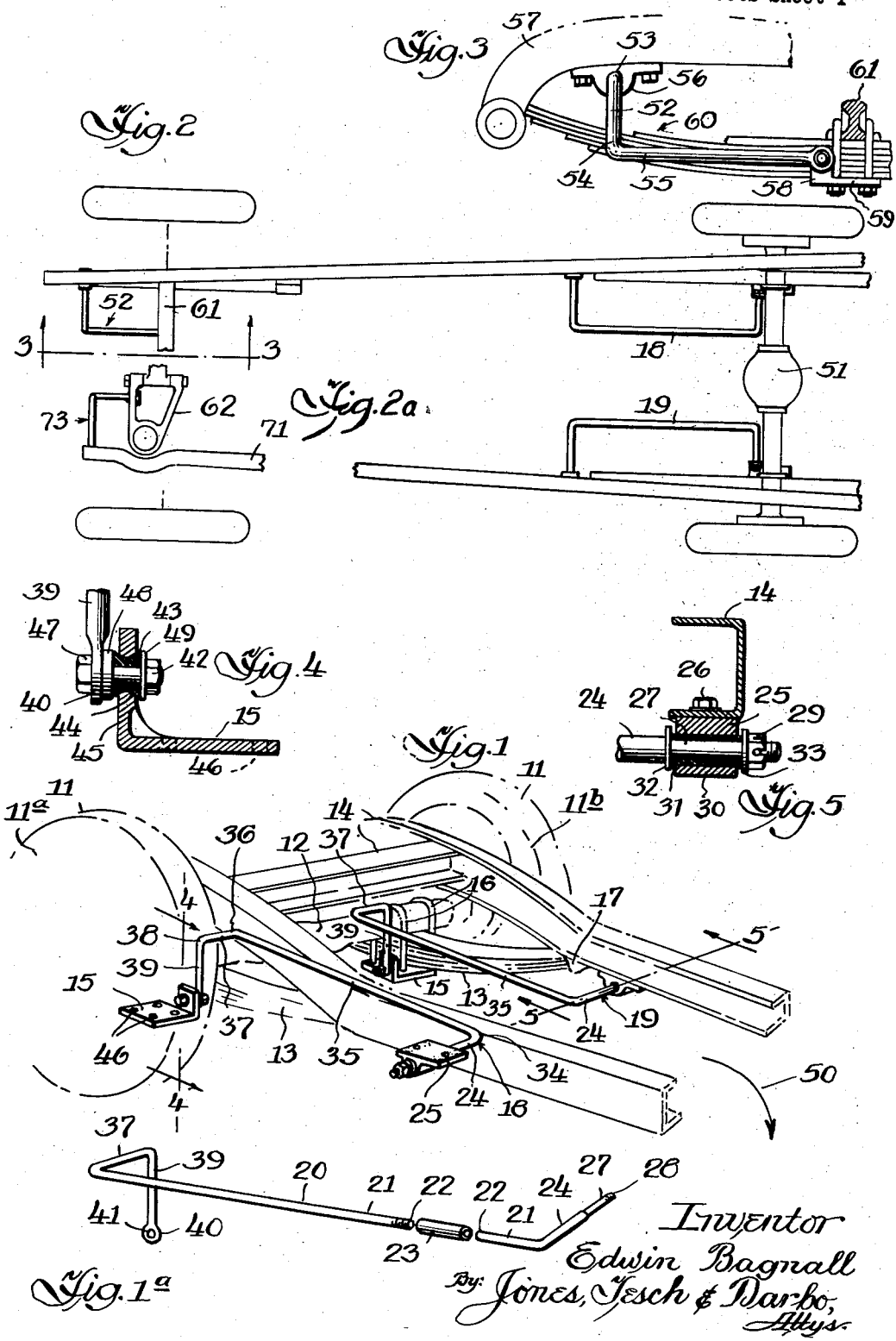

United States Patent Office 2,893,723
Patented July 7, 1959

2,893,723

VEHICLE SWAY INHIBITING DEVICE

Edwin Bagnall, Chicago, Ill.; Margaret L. Gilmer, legatee under the will of Edwin Bagnall, deceased Application July 7, 1955, Serial No. 520,435

2 Claims. (Cl. 267—11)

This invention relates to a device for inhibiting sway in a motor vehicle or the like.

Motor vehicles normally have a running gear comprising wheels, axles and associated parts which resiliently carry the frame, body and associated parts which latter constitute the mass load of the vehicle. The resiliency includes springs which as used at the present time generally are in the form of a pair of elliptical leaf springs at the rear of the vehicle and vertical coil springs at the front. As is well known, some lateral flexibility between the axle and the body, through the spring supports, is normal, but excessive flexibility causes difficulty in that when the motor vehicle rounds a curve there is a tendency for the body to continue in a straight line tangent to the motion of the axle parts, generally accompanied by a tilting action, thus creating a tendency to skid or overturn. Such tendency may be inhibited by means provided by the present invention for employing the force built up in the body in its tendency to sway with respect to the axle to counteract the tendency to skid.

The present invention is especially advantageous, particularly at the front of the vehicle, for cars equipped with power steering, to improve and safeguard their performance.

Furthermore, even when the car is proceeding in a straight direction, when the brakes are applied there is a tendency due to inertia for the body to move faster than the axle, causing a so-called pitch or "nose dive" effect. This makes the brakes chatter and reduces the effectiveness of the brakes while aggravating wear on the brake drums and also on the tires to the extent of causing flat spots on the tires which further unbalance the wheels and aggravate the tendency to skid.

An unfortunate result of excessive swerve or sway of the body with respect to the axle on the spring support often is that when the car goes into a skid, the driver loses control of the car through either under-correction or over-correction of the skid action, with the consequent frequently fatal result of overturning of the vehicle. It has been found that a substantial percentage of highway accidents arise from this cause.

It is a principal object of the present invention to provide means whereby the body may be appropriately mounted on the axle through conventional springs, for example, and which without appreciably carrying any of the spring load will adapt itself to allow the normal spring action while inhibiting the sway and converting the tendency to sway into a force tending to raise the outside wheel on a curve by torque and bending moments.

In my prior Patents No. 2,357,299 of September 5, 1944 and No. 2,389,017 of November 13, 1945 I disclosed and claimed a device of this class formed of a pair of relatively wide leaf elements, commonly known as torsion plates, rigidly connected with the axle and body or frame respectively. The elements forming the device of said patent extend generally in two directions. In the present invention I have disclosed a device in which the elements thereof extend in at least three different directions. The device is here shown made of bar stock rather than plate or leaf stock. An important advantage of the use of bar stock is that it takes up less room under the car, allowing more room for other parts and accessories including shock absorbers, mufflers, tail pipes, this being advantageous particularly at the rear end of the vehicle. If bar stock is to be used for the rear end of the car, it is frequently desirable to use the same material for the front end for the sake of uniformity.

Furthermore, the use of bar stock permits a member having elements extending progressively in at least three different directions to produce moments of both torque and bending forces, with angular relation of elements at right angles which provide at least two free points, i.e., angular bends.

Still another object of the present invention is to provide a device which can be economically manufactured and which may be readily installed at the factory as standard equipment or may be installed as auxiliary equipment in any service station.

These and other objects and advantages will be apparent from the following detailed description, taken together with the accompanying drawings, showing illustrative embodiments of the invention, and in which drawings—

Figure 1 is a view of a perspective automobile chassis including axle parts and body parts with a pair of interposed devices of the present invention associated therewith;

Figure 1a is a separated perspective view of a device made generally in accordance with one of the devices shown in Fig. 1 with a slight modification;

Figure 2 is a plan view of an automobile chassis with one front corner employing semi-elliptical leaf springs and the other front corner indicated as Figure 2a, employing a partial axle and a coil spring, these alternative arrangements at the front end being shown purely for illustrative purposes;

Figure 3 is an enlarged elevational view taken on the line 3—3 of Fig. 2;

Figure 4 is a fragmentary section taken on the line 4—4 of Fig. 1;

Figure 5 is a similar section taken on the line 5—5 of Fig. 1;

Figure 6 is a view of a front corner construction employing a partial axle and coil spring corresponding to the construction shown in Fig. 2a;

Figure 7 is a plan view of the structure of Fig. 6;

Figure 8 is a perspective separated view of parts shown in Figs. 6 and 7;

Figure 9 is a view of the device, somewhat diagrammatically, shown as applied to a van or trailer; and Figure 10 is a perspective view of the specific device shown in Fig. 9.

Referring in detail to the illustrative constructions shown in the drawings, and turning first to Fig. 1, numeral 11 indicates the usual vehicle rear wheels attached to axle member 12, and on which, through the intermediation of semi-elliptical leaf springs 13 (a system of which occurs adjacent each of the rear wheels 11) the body frame 14 is resiliently supported for movement of the frame and axle relatively to each other in a normal or up and down direction. The semi-elliptical spring systems are shown each anchored to the axle 12 as by a spring bed plate 15 carried by U-bolts 16 arched over the axle and bolted to the bed plate. At each end of each spring system the latter is attached to the frame 14 as by the usual spring pivot 17.

Associated with the generally conventional vehicle parts just described are a pair of side-sway inhibiting devices in accordance with my present invention and designated generally by the numerals 18 and 19, these being advantageously formed of round bar stock as indicated and formed in left and right arrangements, symmetrically complementary.

Each of the devices 18 and 19 includes a plurality of connected elements optionally integrally formed of a single bar and having elements extending in at least three different directions with an intermediate one of said elements forming a right angle with each of the others of said elements, outer ends of said other elements being provided with means for attachment to the axle member and to the frame or body member respectively.

In Fig. 1a I have shown a member 20 which corresponds generally to the members 18 and 19 but includes a member 21 that is discontinued as at 22 to have interposed between the gap at 22—22 an element 23 of semi-rigid, somewhat pliable material such as hard rubber, made in the manner of a tube section into which the element ends 22 may be tightly driven, the resulting structure 20 being thus operatively integral.

A detailed description of device 18 and its manner of attachment to the axle and frame members will next be given, with the observation that the description of member 18 will apply also to members 19 and 20, recognizing the differences already hereinabove pointed out.

Member 18 has an end element 24 which is connected to an anchor plate 25 securely attached to frame 14 as by the usual bolts and bolt holes 26. As best seen in Figure 5, element 24 has a reduced termination 27 that is threaded as at 28 to have screwed thereonto the nut 29 after the termination 27 has been passed through a perforated ear 30 depending from the anchor plate 25, in the bore of which ear has been inserted a bushing 31 of elastomeric material such as fairly hard but somewhat resilient rubber or the like, washers 32 and 33 desirably abutting the ends of the sleeve 31 respectively.

Continuing the description of the member 18, the element 24, which extends in a direction transversely of the frame, merges, by a right angular bend 34, into the longitudinally extending element 35, which, by another right angular bend 36, merges into another transversely extending element 37. The latter, by another right angular bend 38, merges into the vertically extending element 39, the lower end 40 of which is perforated as at 41 to receive therethrough, as best seen in Fig. 4, a headed bolt 42 that passes through a sleeve 43 of elastomeric material located in a bolt opening 44 in the vertically extending flange 45 of the spring bed plate 15, the latter having the holes 46 therethrough for the U-bolts 16. To secure the attachment of the element 39 to the flange 45, which in this instance is shown formed integrally with the bed plate 15, the bolt 42, after being passed through the bolt hole 41, has screwed thereonto the nut 42, a washer 48 being desirably interposed between the bushing 43 and the element termination 40, a flange 49 on the bolt head 47 abutting the sleeve 43 at its other end.

The bars such as 18 are desirably of continuous spring steel stock, and, for most automobiles, of the order of three-quarters inch diameter.

The elastomeric sleeves or bushings 31 and 43 provide slightly yielding rigid connections between the member 18 and the axle and body members respectively, or what might be termed a semi-rigid connection.

The member 18 constitutes connecting means between the vehicle frame and the axle, comprising a pair of elements 24 and 39, for example, rigidly interconnected generally normal to one another and substantially rigidly connected with the frame and axle elements respectively, said elements 24 and 39 being so resiliently flexible in a direction permitting vertical movement of the axle element relative to the frame element as to perform no substantial load carrying function and resisting movement of the axle element transversely of the vehicle. The connections at 31 and 43 are rigid in the sense that they do not yield materially in a direction transverse to the vehicle. Elements 39 are normally spaced slightly from axle 12 but undue vertical flexing of the members 18 and 19 is prevented by abutment of the element 39 of each member with the axle.

When now the vehicle having the axle 12 and frame 14 makes a turn from a path of travel parallel to the wheels 11, and the inertia of the body parts tends to cause side sway due to the tendency of the body to maintain a straight line travel tangent to the curve which the axle describes, the device 18 and in this case both devices 18 and 19 come into play. Assuming that the vehicle is making a turn in the direction of the arrow 50 (Fig. 1), the wheel 11a will be the inside rear wheel and the wheel 11b the outside rear wheel. The action is as follows:

The inner wheel 11a which has a shorter arc of travel around the curve will turn more slowly than the outer wheel 11b which turns more rapidly to accommodate its greater arc of travel. The tendency of the body frame is to shift or tilt away from the wheel 11a and toward the wheel 11b. This tendency may be counteracted if it can be transmuted into a force tending to raise or lift the outer wheel 11b. To accomplish this the element 24 of each of the members 18 and 19, which is put under a bending moment by the tilting tendency, sets up a torque in the element 35. This torque moment in the element 35 in turn creates a bending moment in the element 27. Adjacent the outer wheel bending of 37 of member 19 tends to lift element 39 and thereby to lift outer wheel 11b. Adjacent the inner wheel bending of 37 of member 18 tends to press down on element 39 of member 18. It will be seen that the result of these torque and bending moments is to create a force tending to stabilize the mass load thus eliminating or inhibiting the tendency for the vehicle to skid, and, more seriously to overturn. In the case of a purely lateral shift, with no tilting tendencies, which is sometimes called "road wander" the bending moment may occur in the elements 35 and 37 and the torque moment may occur in the element 39. In either case, there is a composite of torque and bending moments, and the available moment of torque force possible without danger of breaking of the members is enhanced by the relative long element 35, or by element 23 in member 20.

Thus far I have described the action and an illustrative structure accommodating itself to the arrangement of the vehicle at its rear end. At the front end of the vehicle, the action is substantially the same and I have shown an illustrative structure similar in principle to that already described but specifically different in details which will next be explained.

Assuming for example that the vehicle has a semi-elliptical leaf spring suspension at its front end, as somewhat diagrammatically illustrated in the upper left hand corner of Fig. 2 and in Fig. 3. As here illustrated I have shown an alternative form of sway inhibiting device 52 of bar stock having three elements 53, 54 and 55, the elements 53 extending transversely of the vehicle, the element 54 extending vertically of the vehicle and the element 55 extending longitudinally of the vehicle. The element 53 is shown anchored through an anchor plate 56 to the frame 57 and the element 55 is shown anchored to an extension 58 of the spring bed plate 59 through which the spring system 60 is supported on the axle 61. The attachment at 56 may be similar to that shown in Fig. 5 and the attachment at 58 similar to that shown in Fig. 4.

In Fig. 2a I have shown an illustrative construction adapted to a suspension comprising a so-called frame 62, and as shown also in Figs. 6 and 7. Conventionally, in this construction, the transverse frame 62 is pivoted as at 63 to the frame member 64 which may support the power plant of the vehicle directly. Frame 62 includes articulated links 65, 66 and 67, the links 65 and 66 being articulated as at 68 and the links 66 and 67 as at 69, and finally the link 67 being articulated as at 70 to the upper face of the frame member 64 and through it with the body frame 71 which is rigid with the frame member 64. The usual vertical compression coil spring 72 is ensconced in the lower link 65 of the frame 62 and extends upwardly into supporting relation with the frame member 64 and frame 71. For the conventional front end construction just described, I have provided the sway inhibiting device 73 which is similar in principle to the devices previously described. Specifically, the device 73 includes an element 74 which extends transversely of the vehicle, an element 75 extending downwardly from the element 74 and vertically of the vehicle, and an element 76 which extends longitudinally of the vehicle.

The element 74 may be attached as at 77 to the frame member 71, and the element 76 may be attached as at 78 to the frame link 65, adjacent its pivot 63. The connection 77 is substantially the same as the connection shown in Fig. 5, and the connection 78 is substantially the same as that shown in Fig. 4. The devices 52 and 73 may be substantially similar, being for lefts and rights of a vehicle front end.

It will be understood that when the vehicle front end comprises elliptical springs with a unitary axle, as shown at the upper left hand corner of Fig. 2, the member 52 will be formed for the left front end of the vehicle complementarily to its formation as shown in Fig. 2 for the right-hand end. Similarly when the vehicle front end is provided with split axles as shown at the lower left-hand corner of Fig. 2, the member 73 will be formed for the other front corner of the vehicle complementarily to its formation as shown in Fig. 2 and in Figs. 6, 7 and 8.

In the operation of the member 73, as shown in Figs. 6, 7 and 8 for example which is adjacent the left front wheel of the vehicle, the operation is in general as follows:

If the vehicle is traveling in a straight line, the device 73 will not interfere with the spring action, but if now the car is making a turn to the right, the wheel 11c, being now the outside wheel, any tendency of the mass load or body frame to shift or tilt in the direction of the wheel 11c sets up a downward bending moment in the element 74 of the member 73, which in turn creates a lateral bending moment in the element 75, and this in turn creates a torque force in the element 76. Resistance of the element 76 to this torque force is transmitted to resistance of the element 74 to the downward bending force. At the opposite side of the car, that is, adjacent the inner wheel on the turn, resistance is provided by the complementary member similar to the member 73, that is by a combination of resistance to bending and torque forces.

Member 73 is advantageously specifically different from member 18 for example so as to avoid interference with the turning action of the wheels.

In Fig. 9 I have shown an adaptation of the device to a van or trailer body. Here, and also as separately shown in Fig. 10, the sway inhibiting device 79 has a vertical element 80 which is secured as at 81 to the axle of the vehicle 82. Instead of extending longitudinally of the vehicle, in this case, the element 80 extends vertically, substantially throughout the height of the body 83, and, adjacent the roof 84 of the body, merges by a right angle turn into an element 85 which extends longitudinally forwardly of the body 83 and then by another right angle turn is continued laterally in an extension 86, the extension 86 being secured to a plate 87 suitably attached on the undersurface of the roof of the body 83. The device 79 therefore has elements extending progressively in three different directions by right angular turns similarly to the other sway inhibiting devices herein described. In the case of Fig. 9 the moments of forces are enhanced by the attachment of the device 79 at one end to the highest point of the body 83, that is to say at the highest point of the mass load, while being attached at its other end to the axle. In any tendency of the mass load to shift or tilt a torque and bending moment will be set up in element 85, which sets up a bending moment in element 80.

In the present invention I have provided at least two free points, such as for example at the angles 34 and 38, which contribute to desirable distribution of stresses in the member.

As clearly seen in the drawings, in both the member 18 for example, and the members 73 and 79, the bar has at least three portions extending in at least three different directions respectively and in at least two different planes, an intermediate portion, such as 37, being substantially at right angles to each of said other portions 35, 39, and the member has attachment portions such as 24, 41 at the outer ends of said other portions, the intermediate portion 37 being spaced a substantial distance from portions 24 and 41. 35 and 37 lie in one plane and 39 a different plane, or it may be considered that 37 and 39 lie in one plane and 35 in a different plane. This is true from any point of attachment of the bar to the body and axle members.

Instead of the elastomeric sleeves 31, 43, a fully rotatable connection could be provided where for example it might be desired to eliminate any load carrying function of the members such as 18, but in that case it would be necessary to provide for lubrication of such rotatable connections. Conversely, where it may be desired to have the sway-inhibiting devices such as the member 18 carry a substantial part or even all of the load, then even the resilient sleeves such as 31, 43 could be omitted and the member locked completely rigid at its ends respectively to the axle and the body frame. For the purposes of carrying all of the load it would be preferable rather than to increase the diameter of the bar stock of the member to duplicate the member at say each corner of the vehicle so that there would be a pair of members such as 18 adjacent each wheel.

In each case, since the bar is free of attachment to the body and axle members except at its ends, it conforms to the vertical stroke of spring suspension, thus permitting functioning as described.

My invention having been described, what I claim is:

1. Side sway inhibiting means for vehicles, comprising an axle member and a body member spring mounted thereon, an integral resilient metal bar connected at its outer ends only to said axle member and body member respectively for movement therewith respectively in relative movement thereof, said bar having at least three angularly related portions extending in at least three different directions and lying in at least two different planes, an intermediate one of said portions being angular to two of the other portions, said intermediate portion being free of attachment except to said other portions, said bar having means at its outer ends attaching the bar to said axle and body members respectively in a manner such that said bar provides torque means resisting sway of the body member with respect to the axle member while being free to conform to vertical stroke of spring suspension.

2. The structure of claim 1 wherein one of said portions is of a length extending upwardly of the body to a point adjacent an upper region thereof in a manner such that the bar extends generally vertically.

References Cited in the file of this patent

UNITED STATES PATENTS

| | | |
|---|---|---|
| 203,330 | Elliott | May 7, 1878 |
| 269,633 | Budd | Dec. 26, 1882 |
| 531,689 | Mulholland | Jan. 1, 1895 |
| 913,668 | Mulholland | Feb. 23, 1909 |
| 2,226,621 | Leighton | Dec. 31, 1940 |
| 2,557,354 | Kivel | June 19, 1951 |
| 2,726,857 | Giacosa et al. | Dec. 13, 1955 |